Patented July 27, 1948

2,445,879

UNITED STATES PATENT OFFICE 2,445,879

PROCESS OF TREATING EGGS

George O. Hall, Murrysville, Pa., assignor to Hall Laboratories, Inc., Pittsburgh, Pa., a corporation of Pennsylvania No Drawing. Application October 8, 1945, Serial No. 621,175

7 Claims. (Cl. 99—210)

This invention relates to a process of treating eggs after removal from the shell to inhibit proteolytic action and coagulation thereof as well as to the product of such treatment.

I have found that the addition of molecularly dehydrated phosphate of the type described hereinafter to egg whites or yolks, separately or together, inhibits the proteolytic action and coagulation of the eggs either upon accidental thawing of frozen eggs or upon heating eggs to dry them. If frozen eggs thaw accidentally there is danger of proteolytic action setting in. This undesirable reaction may be eliminated or at least inhibited if there is added to the churned eggs prior to freezing a suitable amount of molecularly dehydrated phosphate. The amount of molecularly dehydrated phosphate required is at least about 3 to 5% by weight of the eggs. This amount may be exceeded without harmful effect but is uneconomic.

By "molecularly dehydrated phosphate" I mean any phosphate which can be considered as derived from a monobasic or dibasic orthophosphate or from orthophosphoric acid or from a mixture of any two of these by elimination of water of constitution therefrom. The molecularly dehydrated phosphates which may be employed according to the present invention have a molar ratio of $R_2O$ to $P_2O_5$ not greater than about 1.7:1, where R represents one or more alkali-metals, hydrogen or ammonium or any combination thereof. The molecularly dehydrated phosphate may be either glassy or crystalline. Among the glassy phosphates the commercial product having a ratio of $Na_2O$ to $P_2O_5$ of about 1.1:1 is preferred although any sodium phosphate glass having a molar ratio of $Na_2O$ to $P_2O_5$ less than 1.7:1 may be employed even including metaphosphoric acid or $P_2O_5$, provided the pH of the eggs is kept at a suitable value by the addition of other materials where necessary. Suitable crystalline molecularly dehydrated phosphates are the tripolyphosphates and the water-insoluble alkali-metal metaphosphates. Among the crystalline metaphosphates I may employ are the water-insoluble crystalline sodium and potassium metaphosphates. As pointed out in Taylor British Patent 543,218, granted February 16, 1942, water-insoluble crystalline sodium metaphosphate may be dissolved in a solution of any water soluble potassium salt or of any alkali-metal salt other than sodium salts, or of any ammonium salt. Similarly, water-insoluble crystalline potassium metaphosphate may be dissolved in a solution of any water-soluble sodium salt or of any alkali-metal salt other than potassium salts, or of any ammonium salt. Furthermore, a mixture of water insoluble crystalline sodium metaphosphate and water-insoluble crystalline potassium metaphosphate will dissolve in water. In accordance with Munter U. S. Patent 2,130,557, water-insoluble crystalline sodium metaphosphate or water-insoluble crystalline potassium metaphosphate may be solubilized by the addition thereto of a strong mineral acid, as for example, sulphuric acid or hydrochloric acid. The solution may then be neutralized to any desired extent. Water-insoluble crystalline sodium metaphosphate or water-insoluble crystalline potassium metaphosphate when thus solubilized or when solubilized by any other suitable method may be employed according to the present invention. Pyrophosphates, either the normal pyrophosphates or the acid pyrophosphates are not effective in treating eggs to inhibit proteolytic action or coagulation.

In the drying of eggs, the use of molecularly dehydrated phosphates of the type specified is of great advantage. In making dried eggs, the churned eggs are heated under reduced pressure in order to remove the water. The drying may be done by heating the eggs in pans or by spraying them in a chamber maintained under reduced pressure. The drying is usually carried out at a temperature not exceeding about 140° F. because otherwise there is danger of causing coagulation of the albumen. By adding a small amount of molecularly dehydrated phosphate to the churned eggs and then drying them, the drying temperature used can be raised from about 140° F. to about 160-180° F. without danger of coagulating the albumen. This enables the drying process to be carried out more rapidly than in the absence of the molecularly dehydrated phosphate. In preparing dried eggs, the molecularly dehydrated phosphate should amount to at least about 5% by weight of the albumen present. Ordinarily the amount of molecularly dehydrated phosphate constitutes about 5 to 10% by weight of the albumen. Higher percentages of the phosphate up to an amount equal to about two and a half times or three times the weight of the albumen can be employed, but, of course, such large amounts would be uneconomic and there is no necessity of employing an amount of phosphate more than about 5 to 10% by weight of the albumen present.

Tests have been made showing the effect of additions of molecularly dehydrated phosphate in preventing coagulation of eggs during heating.

A 2% solution of egg albumen and 1% and 5% solutions of a sodium phosphate glass having a molar ratio of $Na_2O$ to $P_2O_5$ of about 1.1:1 were prepared. Portions of the solutions were mixed and made up to a substantially constant volume by addition of water and were then heated to various temperatures. The results were as shown in the following table:

Table

| No. | Grams Albumen | Grams Phosphate | Weight ratio Phosphate to Albumen | Results at— | | |
|---|---|---|---|---|---|---|
| | | | | 140° F. | 150° F. | Boiling |
| 1 | .02 | 0 | | cloudy | cloudy | coagulated. |
| 2 | .02 | 0.0001 | 1:200 | floc. ppt | floc. ppt | Do. |
| 3 | .02 | 0.00025 | 1:80 | opaque | opaque | Do. |
| 4 | .02 | 0.0005 | 1:40 | do | do | turbid. |
| 5 | .02 | 0.001 | 1:20 | clear | clear | clear. |
| 6 | .02 | 0.0025 | 1:8 | do | do | Do. |
| 7 | .02 | 0.005 | 1:4 | do | do | Do. |
| 8 | .02 | 0.01 | 1:2 | do | do | Do. |
| 9 | .02 | 0.015 | 1:1.3 | do | do | Do. |
| 10 | .02 | 0.02 | 1:1 | do | do | Do. |
| 11 | .02 | 0.03 | 1:0.7 | do | do | Do. |
| 12 | .02 | 0.04 | 1:0.5 | do | do | Do. |
| 13 | .02 | 0.05 | 1:0.4 | do | do | Do. |
| 14 | .02 | 0.1 | 1:0.2 | turbid | turbid | turbid. |
| 15 | .02 | 0.15 | 1:0.13 | do | do | coagulated. |

It will be seen from the table that in Examples 1 through 4 the amount of metaphosphate in proportion to the albumen was insufficient to prevent precipitation or coagulation. In Examples 5 through 13 the amount of phosphate was sufficient to prevent precipitation but as shown in Examples 14 and 15 when the proportion of phosphate becomes too large some precipitation occurs. The phosphate begins to become effective when it is in an amount of about 5% by weight based on the amount of albumen present (Example 5). It remains effective until the phosphate is about two and a half times the amount of albumen. When the phosphate amounts to about five times the albumen (Example 14) the solution again becomes turbid on heating.

The invention may be used not only in drying whole churned eggs, that is, a churned mixture of both egg whites and egg yolks but it may be employed in drying either the egg whites or the egg yolks separately.

The invention is not limited to the preferred materials or proportions, but may be otherwise embodied or practiced within the scope of the following claims:

I claim:

1. The process of treating churned eggs to inhibit proteolytic action and coagulation thereof, which comprises adding thereto at least about 3% by weight of molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates.

2. In the process of making frozen eggs, the step of inhibiting proteolytic action upon accidental thawing, which comprises adding to the churned eggs prior to freezing, molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates, the molecularly dehydrated phosphate amounting to at least about 3% by weight of the eggs.

3. In the process of making frozen eggs, the step of inhibiting proteolytic action upon accidental thawing, which comprises adding to the churned eggs prior to freezing, molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates, the molecularly dehydrated phosphate amounting to at least about 3 to 5% by weight of the eggs.

4. In the process of drying eggs, the step of inhibiting the coagulation thereof, which comprises adding to the churned eggs, molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates, the molecularly dehydrated phosphate amounting to at least about 5% by weight of the albumen present.

5. In the process of drying eggs, the step of inhibiting the coagulation thereof, which comprises adding to the churned eggs, molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates, the molecularly dehydrated phosphate amounting to about 5 to 10% by weight of the albumen present.

6. Churned eggs which are resistant to proteolytic action and coagulation and containing at least about 3% by weight of molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates.

7. Churned dried eggs containing at least about 5% based on the weight of the albumen present, of molecularly dehydrated phosphate having a molar ratio of $R_2O$ to $P_2O_5$ not greater than 1.7:1, where R represents at least one member of the group consisting of hydrogen, alkali-metal and ammonium, said molecularly dehydrated phosphate being selected from the group consisting of molecular dehydrated phosphate glass, tripolyphosphates and water-insoluble crystalline metaphosphates.

GEORGE O. HALL.

REFERENCES CITED

The following references are of record in the file of this patent:

UNITED STATES PATENTS

| Number | Name | Date |
|---|---|---|
| 1,996,801 | Fischer | Apr. 9, 1935 |
| 2,059,399 | Rosner | Nov. 3, 1936 |
| 2,081,273 | Guttenberg et al. | May 25, 1937 |
| 2,183,516 | Mink | Dec. 12, 1939 |
| 2,243,867 | Katzman | June 3, 1941 |
| 2,305,263 | Latshaw | Dec. 15, 1942 |

OTHER REFERENCES

"Uses and Applications of Chemical and Related Materials," 1935, by T. C. Gregory, page 625.